(12) United States Patent
Dyks et al.

(10) Patent No.: US 7,985,437 B2
(45) Date of Patent: Jul. 26, 2011

(54) PROCESS AND APPARATUS FOR STAMPING A PATTERN ONTO A COATED FROZEN CONFECTION

(75) Inventors: Stephen John Dyks, Bedfordshire (GB); Thorsten Hagemeyer, Heppenheim (DE); Holger Thielker, Heppenheim (DE)

(73) Assignee: Conopco, Inc., Englewood Cliffs, NJ (US)

( * ) Notice: Subject to any disclaimer, the term of this patent is extended or adjusted under 35 U.S.C. 154(b) by 906 days.

(21) Appl. No.: 11/524,860

(22) Filed: Sep. 21, 2006

(65) Prior Publication Data

US 2008/0038420 A1    Feb. 14, 2008

(30) Foreign Application Priority Data

Sep. 21, 2005    (EP) .................... 05255824

(51) Int. Cl.
  *A23G 3/28* (2006.01)
  *A23P 1/00* (2006.01)
(52) U.S. Cl. ........... 426/383; 426/91; 426/302; 426/306
(58) Field of Classification Search .................. 426/383, 426/302, 306, 91
  See application file for complete search history.

(56) References Cited

U.S. PATENT DOCUMENTS

| | | | | |
|---|---|---|---|---|
| 2,066,243 A | * | 12/1936 | Barler et al. | 177/173 |
| 3,352,559 A | * | 11/1967 | Larsen | 473/269 |
| 3,978,238 A | * | 8/1976 | Frey et al. | 426/523 |
| 4,726,253 A | * | 2/1988 | Russell | 74/569 |
| 5,516,540 A | | 5/1996 | Cathenaut | |
| 5,948,456 A | * | 9/1999 | Jones et al. | 426/100 |
| 6,276,272 B1 | * | 8/2001 | Takami et al. | 101/401.1 |
| 6,406,733 B1 | | 6/2002 | Willcocks et al. | |
| 2001/0046535 A1 | * | 11/2001 | Bowling | 426/87 |
| 2003/0175385 A1 | * | 9/2003 | Helferich et al. | 426/91 |
| 2004/0091594 A1 | * | 5/2004 | Ackley et al. | 426/383 |
| 2004/0265433 A1 | | 12/2004 | Leas et al. | |

FOREIGN PATENT DOCUMENTS

| | | |
|---|---|---|
| EP | 0946699 A2 | 10/1999 |
| EP | 1149536 A1 | 10/2001 |
| EP | 1346644 A1 | 9/2003 |
| EP | 1346645 A1 | 9/2003 |
| EP | 1256740 A1 | 10/2003 |
| EP | 1356738 A1 | 10/2003 |
| EP | 1356741 A1 | 10/2003 |
| EP | 1396191 A1 | 3/2004 |
| EP | 1396192 A1 | 3/2004 |
| EP | 1430784 A1 | 6/2004 |
| EP | 1604573 A1 | 12/2005 |
| GB | 2 005 125 | 4/1979 |

(Continued)

OTHER PUBLICATIONS

European Search Report Application No. EP 06 07 6699 dated Dec. 11, 2006.

(Continued)

*Primary Examiner* — Timothy M Speer
*Assistant Examiner* — Felicia C King
(74) *Attorney, Agent, or Firm* — Gerard J. McGowan, Jr.

(57) ABSTRACT

A process for stamping a pattern onto a coated frozen confection comprising the steps of:
  a) at least partially covering the frozen confection with a layer of coating; and
  b) bringing a stamping surface into contact with the coated frozen confection; characterized in that in step (b) the coating is liquid.

14 Claims, 9 Drawing Sheets

FOREIGN PATENT DOCUMENTS

| | | |
|---|---|---|
| WO | WO 98/30109 | 7/1998 |
| WO | WO 98/30111 | 7/1998 |
| WO | WO 99/34685 | 7/1999 |
| WO | WO 01/78519 A1 | 10/2001 |
| WO | WO 02/052944 | 7/2002 |
| WO | WO 02/052944 A1 | 7/2002 |
| WO | WO 02/078460 | 10/2002 |
| WO | WO 02/078460 A1 | 10/2002 |
| WO | WO 02/089595 A1 | 11/2002 |
| WO | WO 03/079804 A1 | 10/2003 |
| WO | WO 2004/068963 A1 | 8/2004 |
| WO | WO 2006/086781 A2 | 8/2006 |
| WO | WO 2006/108307 A1 | 10/2006 |

OTHER PUBLICATIONS

European Search Report Applicaton No. 05 25 5824 dated Feb. 14, 2006.

Clarke, C., "The Science of Ice Cream", Royal Society of Chemistry, Cambridge, UK, 2004, pp. 93-94.

Clarke, C., "The Science of Ice Cream", Royal Society of Chemistry, Cambridge, UK, 2004, pp. 94-96.

\* cited by examiner

PROCESS AND APPARATUS FOR STAMPING A PATTERN ONTO A COATED FROZEN CONFECTION

TECHNICAL FIELD OF THE INVENTION

The present invention relates to a process and apparatus for producing coated frozen confections having a pattern, such as an image, shape or logo, embossed upon them. In particular, it relates to a process for stamping a pattern onto a coated frozen confection when the coating is liquid.

BACKGROUND TO THE INVENTION

Frozen confections which consist of ice cream, frozen yoghurt, water ice or the like coated with chocolate, frozen fruit juice, or other coatings are popular products. These products are often supported on a stick so that they can be conveniently consumed without being held directly, thus avoiding the consumer's fingers becoming covered with the coating.

Chocolate coated stick products are one example of this type of product that has been known for many years. They are usually produced by an "extrude and cut" process, as follows. Ice cream from the freezer is extruded vertically downwards though a nozzle onto a conveyor. Sticks are inserted as the ice cream comes out of the nozzle and a heated wire cuts it horizontally into uniform portions of the required thickness. While the aim is to insert sticks parallel to the cut surface of the ice cream and in the middle of the portion, in practice sticks are often slightly misplaced or misaligned. The conveyor carries the ice cream through a hardening tunnel where its temperature is reduced to about $-25°$ C. After the ice cream leaves the hardening tunnel, its stick is picked up by a stick gripper. The stick gripper consists of sets of tongs mounted on a carriage frame. Molten chocolate is held in a dipping tank at about $45°$ C. The stick gripper transfers the ice cream to the dipping tank, where it is lowered into the liquid chocolate for a certain time, and then removed. After dipping, the chocolate begins to solidify on the cold ice cream. Within a few seconds the liquid chocolate becomes dry to the touch and has plastic or leathery texture. This arises from partial crystallization of the fat. Crystallization continues slowly, and it typically takes at least several hours for the chocolate to become brittle (i.e. it cracks when deformed).

The shape and/or surface appearance of such products is a significant factor in their appeal to consumers. Efforts have therefore been made to find methods for making products having an image or logo embossed upon them. WO 02/052944 describes an embossing device and a method for embossing characters or structures onto frozen confectionery articles by means of a metal stamp at a temperature of between 0 and $60°$ C. The embossed frozen confection may then be coated with chocolate. However since coating occurs after stamping, fine details of the stamped pattern are lost because the chocolate covers them up. This process is therefore only suitable for large and simple structures, and in particular it is not suitable for structures below about 3 mm in size. Similarly, the embossing depth must be at least about 4 mm.

WO 02/078460 describes an alternative process in which the ice cream is first shaped in a mould and a stick is inserted, then it is coated, for example in chocolate, hardened and then formed (i.e. moulded or stamped) a second time to produce the final shape. Since forming takes place after coating, the problem associated with the method of WO 02/052944 is avoided and small details can be produced on the product surface. However, the two forming steps makes this process complex and slow.

Therefore there remains a need for a simple process for embossing a pattern with improved feature definition onto a coated frozen confection product. There is also a particular need for a process for embossing a pattern with improved feature definition onto coated frozen confections produced using "extrude and cut" type processes.

Tests and Definitions

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", $6^{th}$ Edition R. T. Marshall, H. D. Goff and R. W. Hartel, Kluwer Academic/Plenum Publishers, New York 2003.

Frozen confection means a confection made by freezing a pasteurised mix of ingredients such as water, fat, sweetener, protein (normally milk proteins), and optionally other ingredients such as emulsifiers, stabilisers, colours and flavours. Frozen confections may be aerated. Frozen confections include ice cream, water ice, frozen yoghurt and the like.

Coating means any edible material which can be used to form a coating layer on a frozen confection. Coatings include chocolate (dark chocolate, white chocolate, milk chocolate), chocolate analogues which are made using fats other than cocoa butter (for example coconut oil), and fruit purees. Coatings are applied to the frozen confection as liquids, but solidify when they are cooled down, for example as a result of contact with the frozen confection. Chocolate and chocolate analogues have complex solidification behaviour because they contain mixtures of different triglycerides which can crystallize in different forms. For example, cocoa butter can exist in six different crystalline forms (polymorphs). As chocolate solidifies, triglycerides begin to crystallize. Within a few seconds the chocolate becomes dry to the touch and has plastic or leathery texture. Crystallization continues slowly, so that it typically takes several hours or days for the to triglycerides to fully crystallize and so that the chocolate reaches its maximum brittleness. Chocolate analogues made from fats other than cocoa butter display similar behaviour to chocolate, but typically crystallize over a narrower temperature range and reach maximum brittleness more quickly than chocolate. In this context, "liquid" means that the coating can flow. "Liquid" does not include coatings in a plastic state when they are deformable, but do not flow.

Stamping Surface

The stamping surface means the surface that makes contact with the coated frozen confection and thereby embosses a pattern onto it. Typically the stamping surface consists of a flat base with raised and/or indented features which form a negative of the desired pattern (i.e. raised features in the stamping surface correspond to depressions in the embossed pattern). Thus, it will be understood that it is the flat base that defines the alignment of stamping surface in relation to the coated frozen confection. It is also possible that the base is not flat, e.g. it is convex, so that the embossed feature is basically concave, with further raised or lowered features. In this case the stamping surface is aligned with the surface of the coated frozen confection when the normal to the centre of the stamping surface is perpendicular to the surface of the coated frozen confection.

Resilient Mounting

A resilient mounting means a mounting which:

(a) allows the stamp to move (relative to the support) linearly in the direction perpendicular to stamping surface, and to tilt about any axis lying in the plane of the stamping surface when it comes into contact with the surface of the coated frozen confection; and (b) applies a restoring force so that the stamp returns to its initial position (relative to the support) when the stamping surface is removed from the surface of the coated frozen confection.

Spring constant (in units of Newtons per millimeter) means the force (in Newtons) that must applied to extend a spring by one millimeter.

Method for Measuring the Temperature of the Stamping Surface

The temperature of a stamping surface is measured using an Agema Thermovision 570 thermal camera (according to the manufacturer's instructions).

We have developed a simple process for stamping a pattern with small features onto a coated frozen confection product. Accordingly, in a first aspect, the present invention provides a process for stamping a pattern onto a coated frozen confection comprising the steps of:

a) at least partially covering the frozen confection with a layer of coating; and b) bringing a stamping surface into contact with the coated frozen confection;

characterised in that in step (b) the coating is liquid.

We have found that it is possible to stamp the product while the coating is still liquid, thus providing very high definition surface features, avoiding the risk of the coating cracking during the stamping step and lowering the force required for stamping. Since stamping takes place after the frozen confection has been coated with chocolate, the problems of poor surface definition associated with coating after stamping are avoided. This process provides a simple method of producing attractive coated products. In this aspect, the invention applies to any coated frozen confection product, for example enrobed ice cream bars, and not only to stick products.

In the extrude and cut process, small errors in stick position (so that the stick is not in exactly the centre of thickness of the cut ice cream) and orientation (so that the stick is slightly twisted with respect to the cut ice cream) are common. Subsequent stamping of the product is difficult because although the position of the stick can be accurately controlled in relation to the stamp, the surface of the coated product to be stamped may be too close, too far away from, or tilted with respect to the correct position. As a result, the embossed pattern may be too shallow (so poorly defined), too deep (so that the stamp penetrates through the coating and reaches the ice cream) or uneven (so that it is deeper at one edge of the stamp than the other). We have developed a process which overcomes the limitations of "extrude and cut" type processes when it is desired to stamp a pattern onto a coated frozen confection.

Accordingly, the process of the present invention preferably further comprises, before steps (a) and (b) the steps of:

(i) extruding the frozen confection from a nozzle;

(ii) inserting a stick into the frozen confection;

(iii) cutting the frozen confection into pieces;

wherein steps (ii) and (iii) take place simultaneously or in either order during step (i); and then subsequently (iv) handling the frozen confection by the stick;

wherein the stamping surface is resiliently mounted on a support.

We have found that when the stamping surface is resiliently mounted on a support it positions and aligns itself with respect to the surface to be stamped as it they come into contact. Therefore the pattern is embossed correctly even when the surface to be stamped is initially incorrectly positioned or misaligned. Preferably the stamping surface is resiliently mounted on the support by a single resilient means. More preferably the single resilient means comprises a spring. Most preferably the spring has a spring constant of from 0.1 to 0.5 N/mm.

Preferably step (b) takes place from 1 to 10 seconds, more preferably from 1 to 6 seconds, most preferably from 2 to 4 seconds after step (a).

Preferably the stamping surface is at a temperature of below $-5°$ C. in step (b). More preferably the stamping surface is at a temperature of between $-5°$ C. and $-100°$ C., most preferably between $-10°$ C. and $-80°$ C. in step (b).

Preferably the thickness of the coating layer is from 0.5 to 5 mm, more preferably from 1 to 3 mm.

Preferably the coating is chocolate or a chocolate analogue. Most preferably the coating is chocolate.

Preferably the frozen confection is ice cream.

Preferably the stamping surface comprises features with a height of from 0.5 to 1.5 mm.

In a second aspect, the present invention provides an apparatus for stamping a pattern onto a coated frozen confection comprising:

a) a means for holding the frozen confection;

b) a stamp, comprising a stamping surface, mounted on a support; and c) a means for moving the support so that the stamping surface can be brought into contact with the surface of the frozen confection;

characterised in that the stamp is mounted on the support by a resilient mounting.

Preferably the resilient mounting comprises a single resilient means. More preferably the single resilient means comprises a spring. Most preferably the spring has a spring constant of from 0.1 to 0.5 N/mm.

Preferably the stamp is made from aluminium or stainless steel.

Preferably the stamp has a mass of from 1 to 20 g, more preferably from 2 to 10 g, most preferably from 3 to 7 g.

Preferably the stamping surface has an area of from 25 to 2500 $mm^2$, preferably from 100 to 900 $mm^2$.

BRIEF DESCRIPTION OF THE INVENTION

The present invention will be further by reference to the figures wherein.

DETAILED DESCRIPTION OF THE INVENTION

Figure 1:
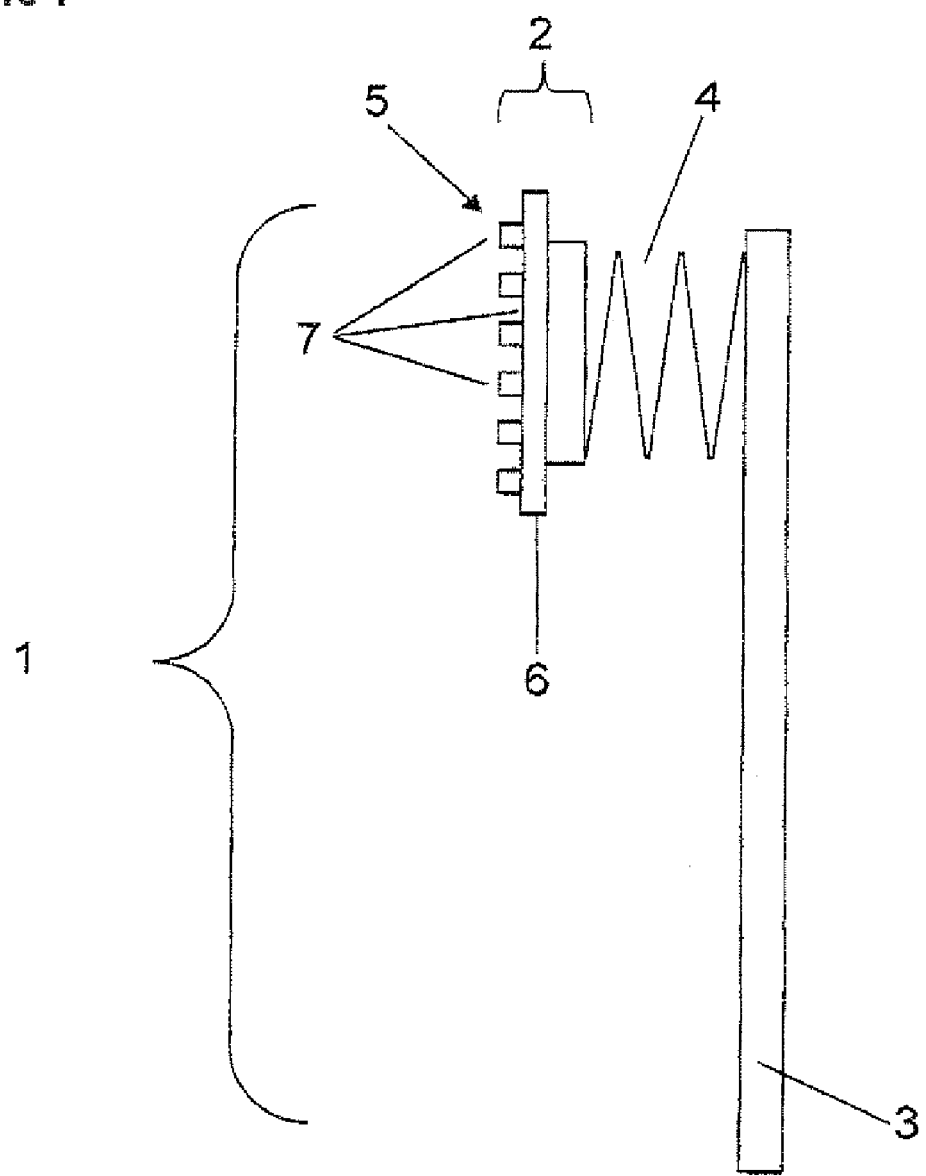
FIG. 1 is a side view of one embodiment of a stamp, mounting and support according to the invention.

FIG. 1 is a side view of one embodiment of a stamping assembly according to the invention. The stamping assembly 1 consists of a stamp 2, a support 3 and a mounting 4 which connects the stamp to the support. The stamping surface 5 of the stamp 2 comprises a flat base 6 and one or more features 7 which are raised out of and/or recessed into the base. The base 6 and features 7 form an inverse of the pattern to be embossed onto the coated frozen confection. The height/depth of the features should be sufficient for the embossed pattern to be clearly defined and apparent, but the height should not be so great that raised features penetrate through the coating, and the depth of recessed features should not be so deep that the coating does not easily fill them. The height and depth of the raised and recessed features respectively depend to some extent on the thickness of the coating. Typically the height and depth are between 0.5 and 1.5 mm, since the coating thickness is typically from 1 to 3 mm. When thin coatings are used, the height and depth of the features should be at the lower end of the range. The features may be tapered by an angle of typically 5 to 15 degrees in order to ease release of the stamp from the coated surface after stamping.

Preferably the stamp is made from a material with good thermal conductivity, such as a metal. More preferably the stamp is made from aluminium or stainless steel. Most preferably the stamp is made from aluminium because aluminium both has good thermal conductivity and low density, so that the mass of the stamp is low. The stamp typically has a mass of a few grammes, such as from 1 g to 20 g, preferably from 2 g to 10 g, most preferably from 3 g to 7 g. The stamp should not be too heavy, since very a heavy stamp would require the mounting 4 to be very stiff. The stamp must be sufficiently large to form the desired pattern, which imposes a minimum mass. Typically the stamping surface 5 has diameter of from 5 to 50 mm, preferably from 10 to 30 mm. The stamping surface 5 may be any shape and need not be circular. Accordingly, the area of the stamping surface 5 is typically from 25 to 2500 mm$^2$, preferably from 100 to 900 mm$^2$. If the mounting 4 comprises a spring, the diameter of the spring is conveniently approximately the same as the diameter of the stamping surface 5, for example the diameters differ by less than 5 mm. Preferably the diameter of the spring is no greater than the diameter of the stamping surface, in order to avoid any possibility of contact between the spring and the coated frozen confection.

Figure 2:
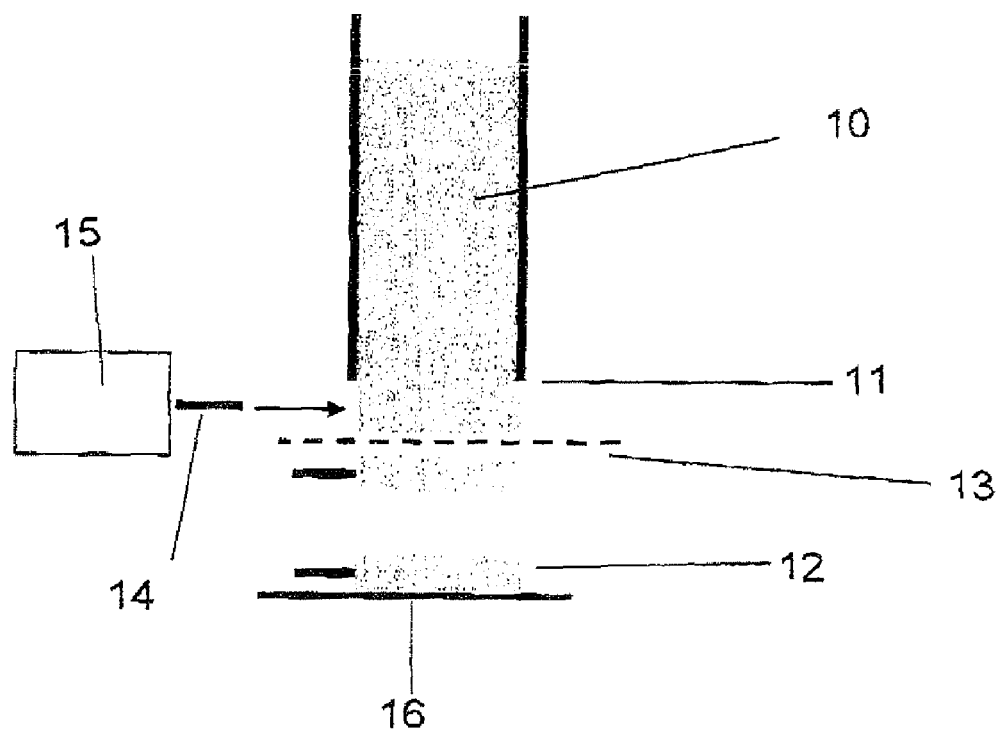
FIG. 2 is a schematic diagram of the extrude and cut process.

FIG. 2 is a schematic diagram of an "extrude and cut" process line. Extrude and cut-type processes for producing are well-known in the field of frozen confectionery manufacture and are described in, for example, "The Science of Ice Cream", C. Clarke, Royal Society of Chemistry, Cambridge, UK, 2004, p 93-94. Frozen confection 10 is extruded vertically downwards through a nozzle 11. Sticks 14 are inserted into the frozen confection 10 by a stick inserter 15. The frozen confection 10 is cut into pieces by the cutter 13. The extruded, sticked and cut frozen confection pieces 12 drop onto a conveyor 16, which transports them through a hardening tunnel. They are then picked up off the conveyor by a stick gripper and dipped into the dipping tank which contains liquid coating material such as chocolate.

The dipping step is also well-known in the art and is described in, for example, "The Science of Ice Cream", p 94-96. In a typical dipping step, the liquid coating, for example chocolate or a chocolate analogue at 40-50° C. is held in a dipping tank. The stick gripper transfers the frozen confection pieces to the dipping tank, where they are lowered into the liquid coating for a certain time, and then removed. The dipping time, frozen confection temperature and viscosity of the liquid coating determine the thickness of the coating layer deposited on the frozen confection pieces. If the dipping time is too short, the frozen confection too warm, or the liquid coating viscosity too low, the coating may be incomplete. The reverse of these can result in a coating that is too thick. Dipping can also be used to coat ice cream with other coatings such as fruit puree. In this case the frozen confection may be cooled by dipping in liquid nitrogen (at −196° C.) immediately before and/or after dipping in the fruit mix. More than one dipping step may be used. Typically the coating layer is from 1 to 5 mm thick; coatings in this range of thickness are suitable for embossing and are liked by consumers.

Figure 3A:
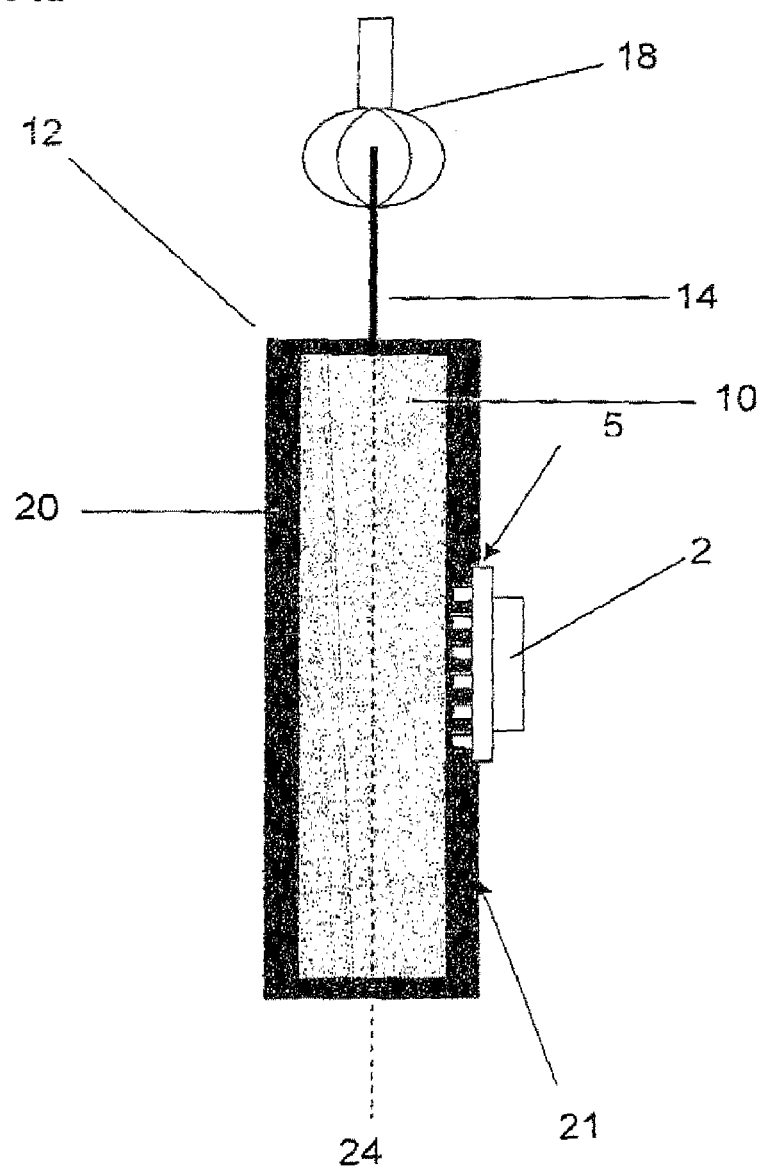
FIG. 3 shows the stamp and a coated frozen confection piece at the point of stamping, and the resulting pattern.
Figure 3B:
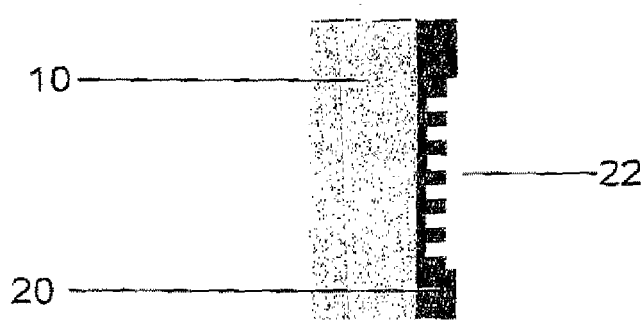
Figure 4A:
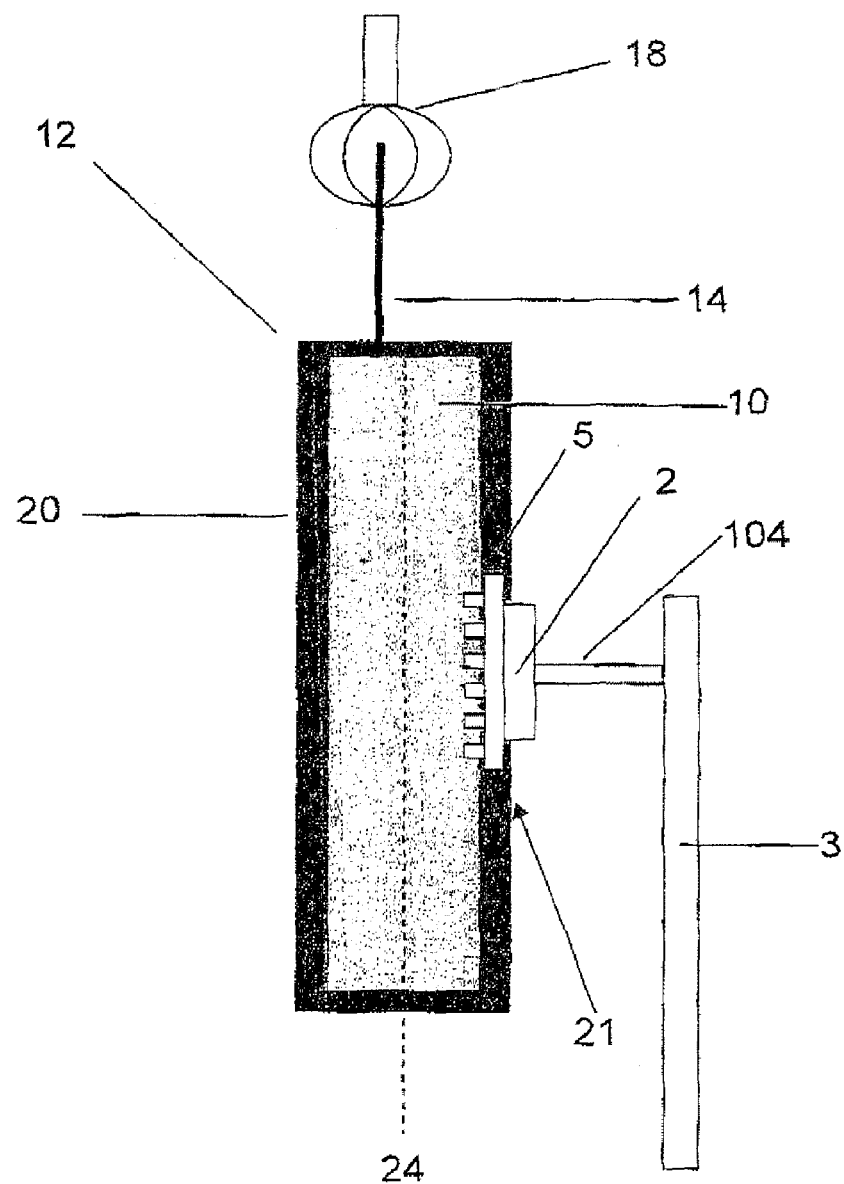
FIG. 4 shows possible variations in stick position and orientation, the corresponding variation in the position of the product surface, and the resulting pattern for a rigid mounting.
Figure 4B:
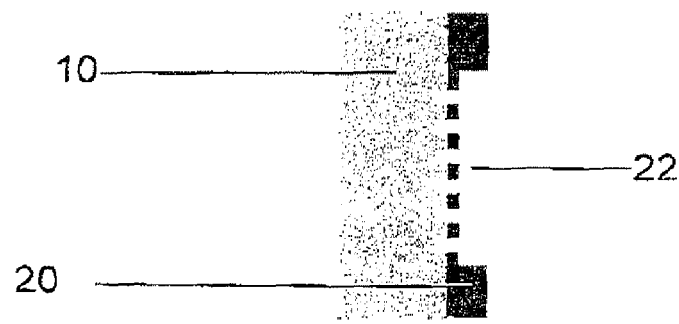
Figure 4C:
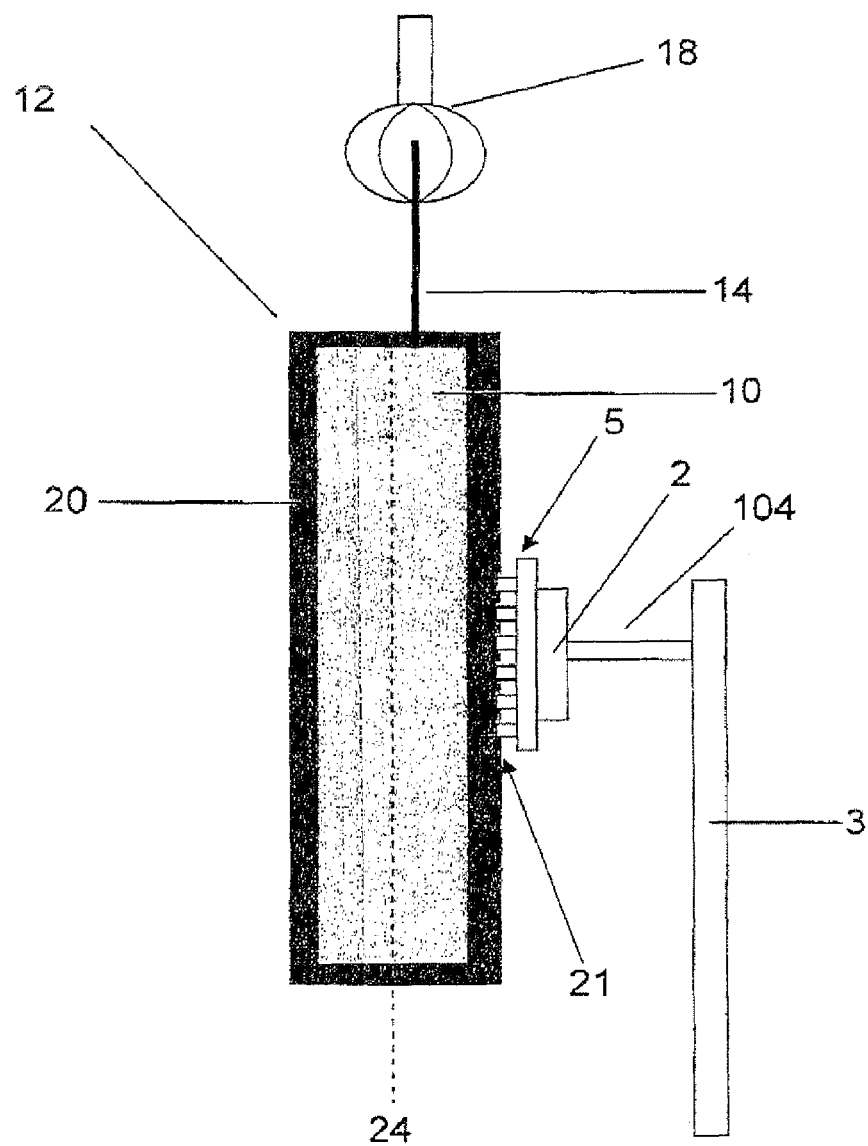
Figure 4D:
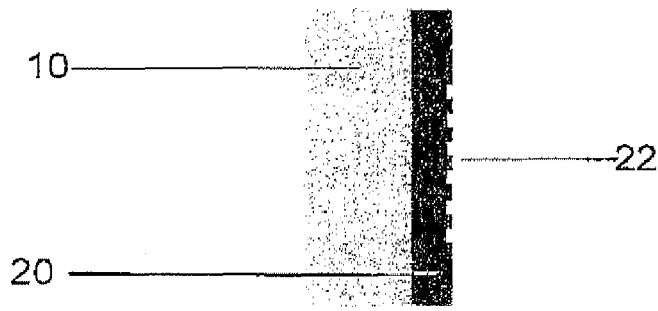
Figure 4E:
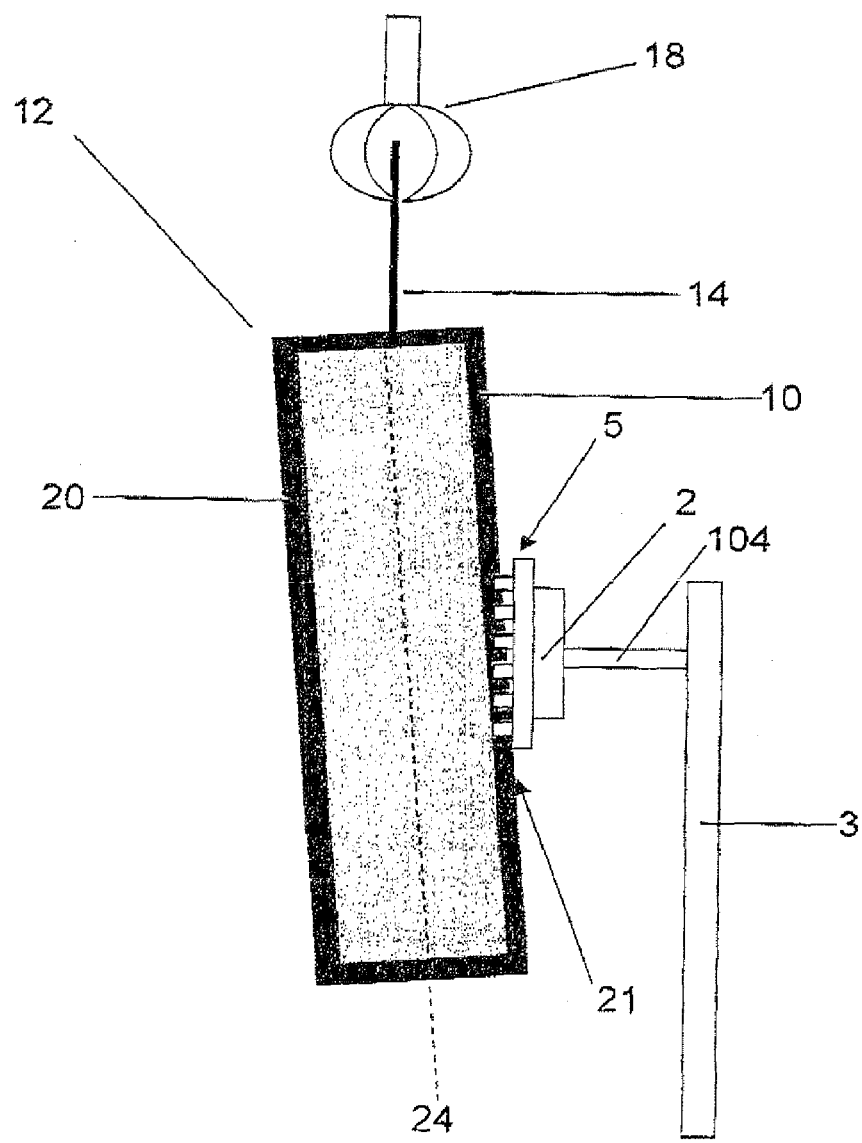
Figure 4F:

After they are removed from the dipping tank, the coated frozen confection pieces are stamped. FIG. 3a shows the stamp and a coated frozen confection piece at the point of stamping. The coated pieces 12, which comprise extruded and cut frozen confection 10 covered in a layer of coating 20, are held by their sticks 14 by the stick gripper 18. The stick 14 is correctly positioned on the centre line 24 of the coated piece 12. The stamp 2 is moved towards the coated piece 12 by moving its support. This brings the stamping surface 5 into contact with the surface 21 which is to be stamped (hereafter referred to as the product surface) and embosses a pattern 22 onto it. Since the stick 14 and therefore the product surface 21 are correctly oriented and positioned with respect to the stamping surface 5, the pattern 22 is embossed correctly, shown in FIG. 3b.

Typically the stamping assembly is indexed with a process line. Depending on where on the coated frozen confection pieces it is desired to stamp the pattern, it may be necessary to position the stamping assembly in the path of the frozen confection pieces for stamping. In one embodiment, the stamping assembly is displaced sideways out of the line (by moving the support) as the coated frozen confection pieces are moved forward to the next index point. In between index steps the coated frozen confection pieces are stationary. The stamping assembly is moved into line with the coated frozen confection pieces and then the stamp is moved towards the frozen confection pieces (i.e. in the direction of the line) to effect the stamping. The stamp is then moved back along the line and finally the stamping assembly is moved sideways out of the path of the frozen confection pieces, to return to its original position, thus allowing them to move to the next index point. In an alternative embodiment, the stamping assembly may be moved vertically instead of sideways. Yet another alternative is to move the frozen confection pieces instead of the stamping assembly. For example, the coated frozen confection pieces can be moved vertically or horizontally out of the line towards the stamping assembly (which is in a fixed position), or they may be rotated through 90 degrees to face a stamping assembly located beside the process line. There may be several such lines in parallel to increase the rate of production.

Preferably the stamping surface is at a temperature of below −5° C. immediately before each stamping operation, more preferably between −5° C. and −100° C., most preferably between −10° C. and −80° C. It has been found that when the stamp is below −5° C., sticking is minimised. Furthermore, the cold stamp causes the coating to set quickly on contact, thereby producing a very well defined pattern. The optimum temperature depends on the nature of the coating. For example, with fruit puree coatings it is preferable to use a lower temperature than with chocolate or chocolate analogues. The stamp can be cooled in a variety of different ways. These include spraying a cryogenic liquid, such as liquid nitrogen onto the stamp between each stamping operation; passing a coolant liquid at low temperature through channels in the stamp; contacting the stamping surface with a cold object or immersing the stamping surface in a reservoir of cold liquid, such as liquid nitrogen, between each stamping operation; or cooling by means of a Peltier plate in contact with the stamp. In order to minimize the formation of frost on the cold stamping surface, which could affect the quality of the embossed pattern, stamping may be performed in a dehumidified atmosphere.

The coating layer solidifies quickly when it comes into contact with the cold frozen confection. If the coating has solidified before it is stamped, a shallow pattern is obtained. Therefore stamping must take place shortly after dipping while the coating layer is still liquid. Preferably stamping takes place from 1 to 10 seconds, more preferably from 1 to 6 seconds, most preferably from 2 to 4 seconds after dipping. Hence, on an indexed process line, stamping typically takes place one, two or three index steps after the coated frozen confection pieces are removed from dipping tank. It has been found that when the stamping takes place shortly after dipping, so that the coating is still liquid, a very well defined pattern is produced.

Preferably the stamping surface is brought into contact with the coated frozen confection with a force of from 5 to 10N. The force must be sufficiently large to produce a good quality logo, but not so large that the stamp pushes through the coating to the frozen confection. It has been found that stamping with a force in this range results in a very well defined pattern.

Referring now to FIG. 4, the positions of the stick-gripper 18 and the stamp support 3 are usually precisely controlled on the process line. However, because of variations in the position and angle of insertion of the stick 14, the position of the product surface 21 may vary. FIG. 4 shows an apparatus in which the stamp 2 is mounted on the support 3 by a rigid, non-resilient mounting, 104. Thus when the stamping surface 5 is moved into contact with the product surface 21, variations of the position and orientation of the product surface 21 result in variations of the depth of the pattern 22 and/or a pattern 22 that is not parallel to the product surface. Three variations in stick position and orientation are shown in FIG. 4 together with the corresponding positions of the product surface 21, and the resulting pattern 22. In FIG. 4a, the stick 14 is inserted to the rear of the central position 24. As a result the product surface 21 is too far forward, and the pattern 22 is too deep, shown in FIG. 4b. The stamping surface 5 may even pass through the coating layer 20 into the frozen confection 10. In FIG. 4c, the stick 14 is inserted forward of the central position 24, so the product surface 21 is too far back, and the pattern 22 shown in FIG. 4d is too shallow. In FIG. 4e, the stick is inserted at the central position 24, but is at an angle to the correct orientation. As a result, the product surface 21 is tilted so that it is not parallel to the stamping surface 5. The pattern 22 is shallow at the top (i.e. near the stick) and deep at the bottom as shown in FIG. 4f, again resulting in an unsatisfactory appearance. Other misalignments of the stick are also possible; for example the stick could be twisted about an axis along its length so that product surface is also twisted about this axis, and the pattern is too deep on one side and too shallow on the other.

We have found that this problem is solved when the stamping surface is resiliently mounted on a support so that it positions and aligns itself correctly with respect to the surface to be stamped as they come into contact. The pattern is embossed correctly even when the surface to be stamped is initially wrongly positioned or misaligned.

FIG. 5 shows the same situations as FIG. 4, but in this case, the resilient mounting 4 causes the stamp 2 (and hence the stamping surface 5) to position and align itself with respect to the product surface. The result is a correctly embossed pattern. In the embodiment shown in FIG. 5, the resilient mounting 4 is a spring. The resilient mounting 4 allows the stamp 2 to move (relative to the support 3) linearly in the direction perpendicular to the stamping surface 5, and to tilt about any axis lying in the plane of the stamping surface 5 when it comes into contact with the product surface 21. The resilient mounting also applies a restoring force so that the stamp 2 returns to its initial position (relative to the support 3) when it is removed from the product surface 21.

The stamping assembly is set up as follows. First, the maximum error in the stick position is known or measured. The support 3 is positioned so that if the stick is inserted at the maximum forward position (i.e. the product surface is furthest away from the stamping surface), then the stamping surface makes contact with the product surface and the resilient mounting 4 is compressed by a small amount when the support 3 is moved to the stamping position. If the stick is inserted in the central position, or to the rear of the central position, the resilient mounting is compressed more when the support 3 is moved to the stamping position. In this way, the stamping surface makes contact with the product surface whatever the position of the stick.

Figure 5A:
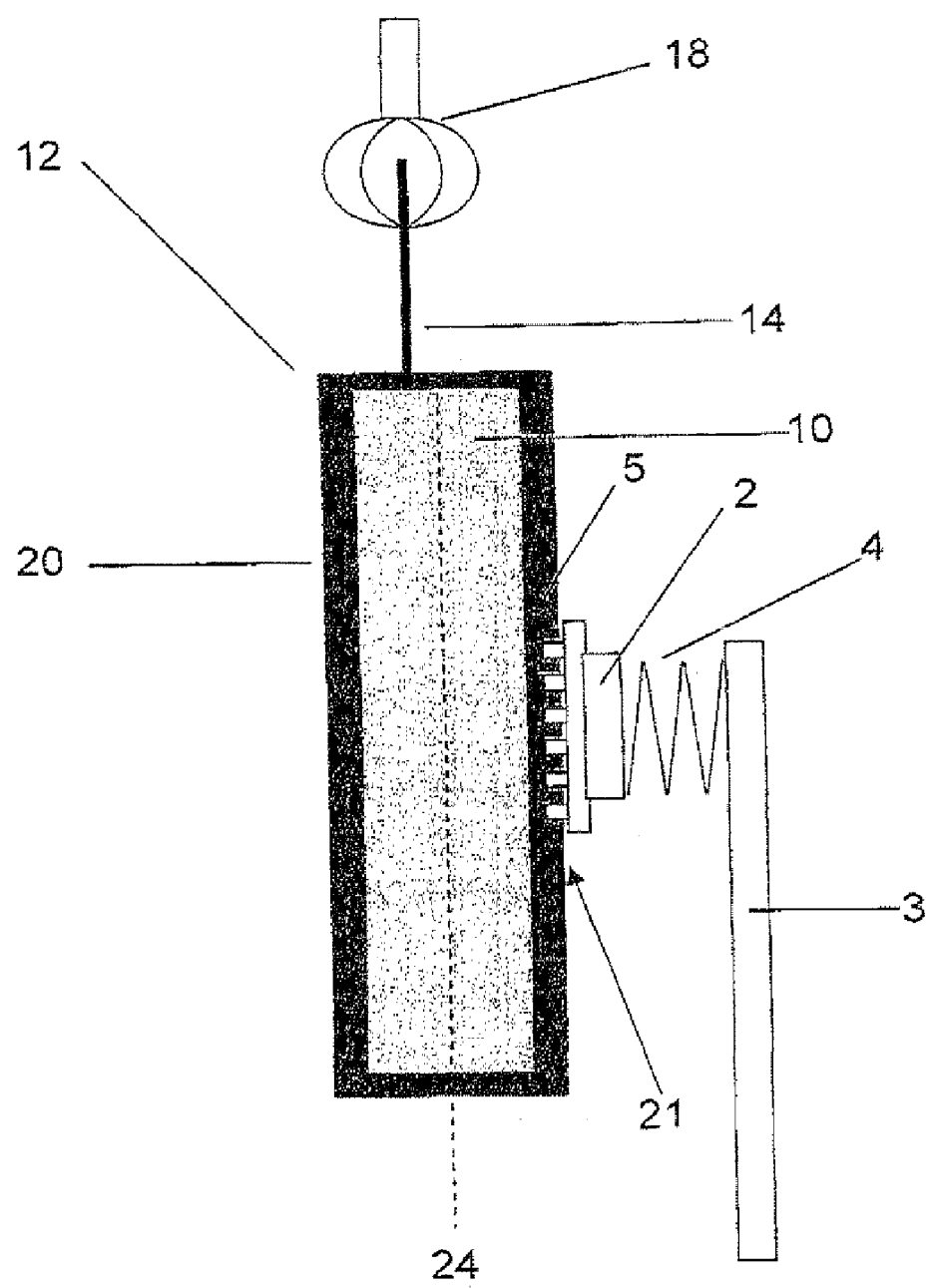
FIG. 5 shows the same situations as FIG. 4, but with a resilient mounting that causes the stamp both to resist penetrating the product too deeply and also to self-align with the product surface.
Figure 5B:
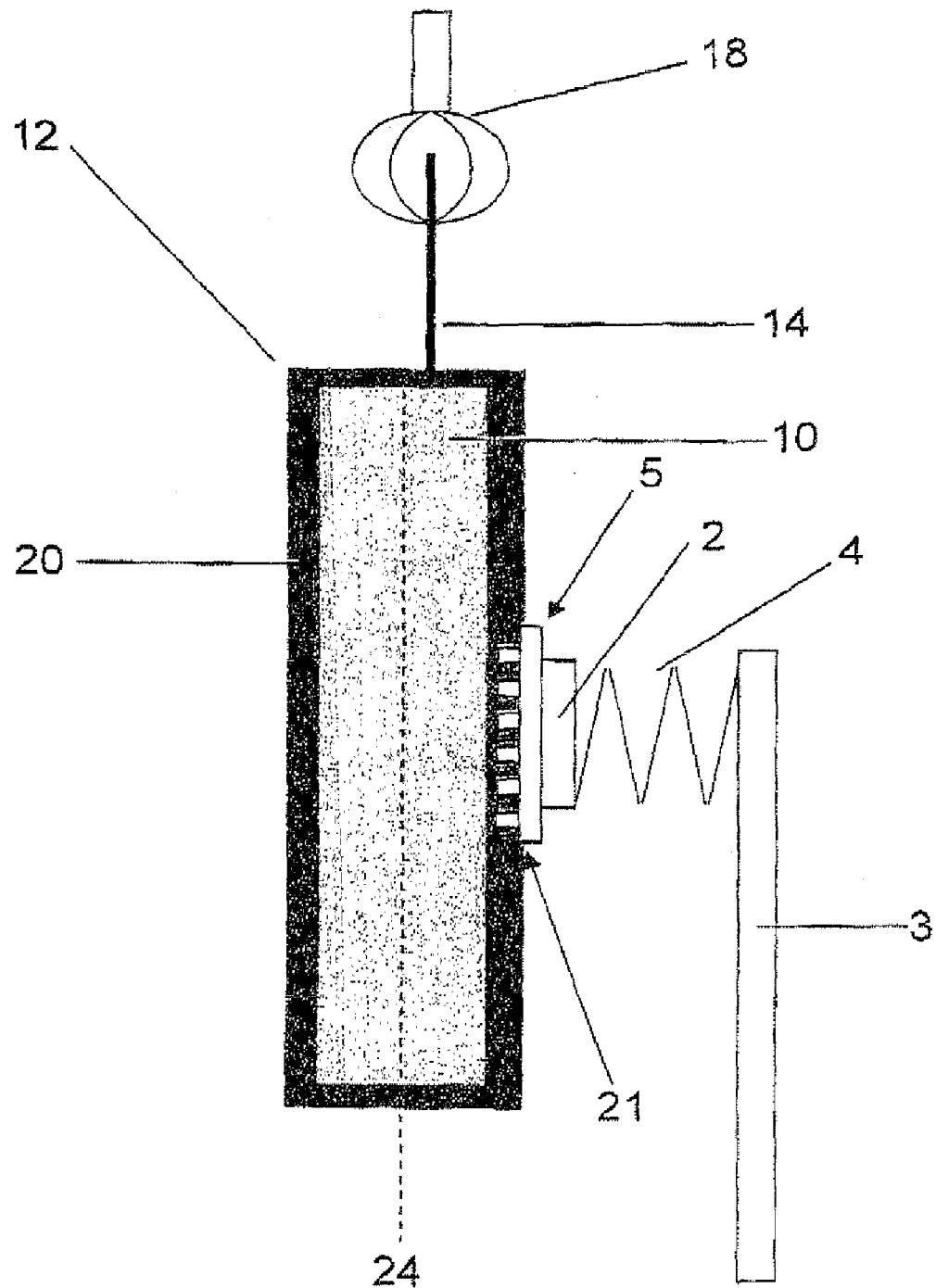
Figure 5C:
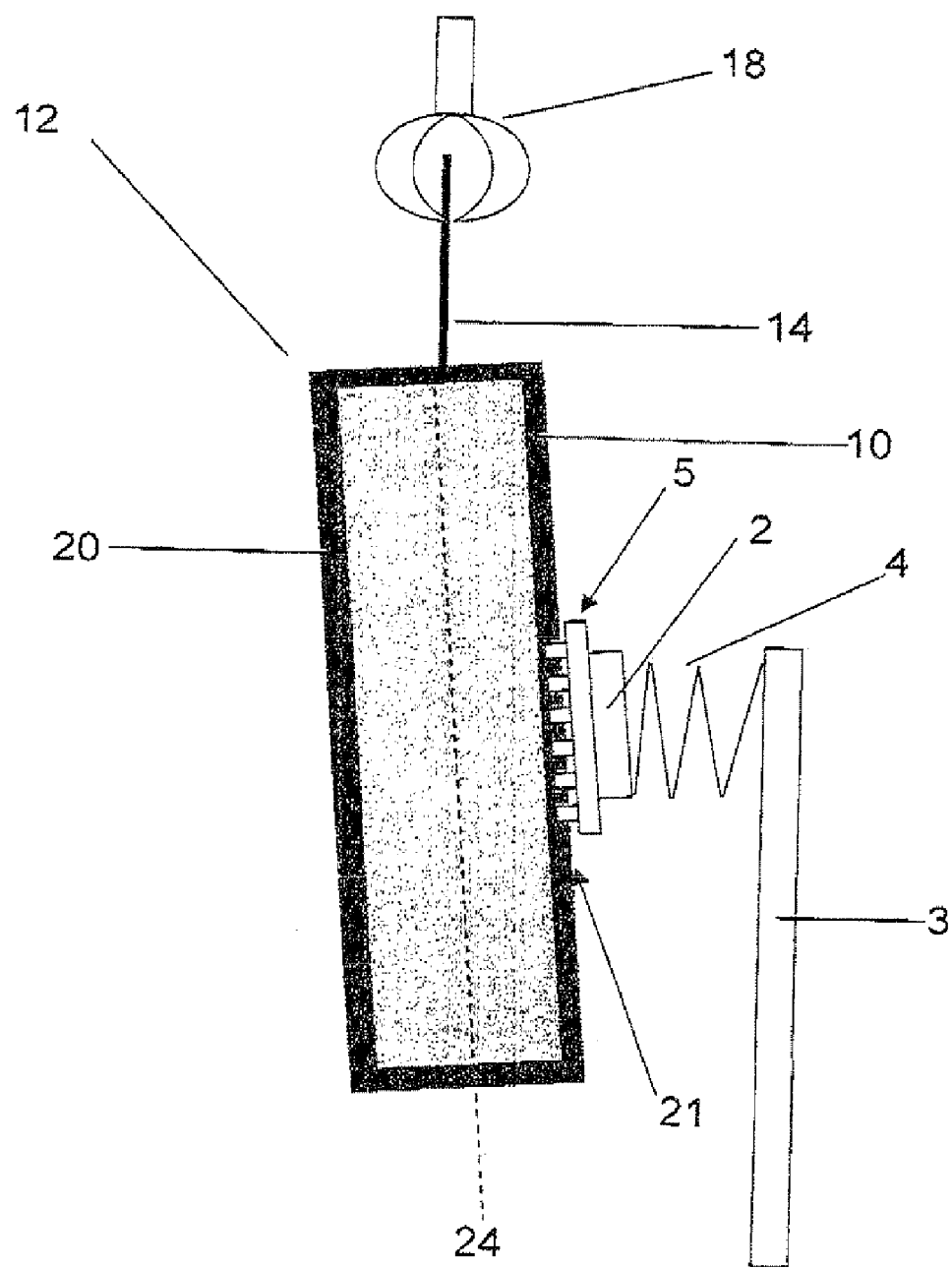

In FIG. 5a, the stick 14 is inserted to the rear of the central position 24. As a result the product surface 21 is too far forward. As the stamping surface 5 comes into contact with the product surface 21, the resilient mounting 4 is compressed so that the stamping surface does not penetrate too deep into the coating. As a result, the pattern is embossed correctly. In FIG. 5b, the stick 14 is inserted forward of the central position 24, so the product surface 21 is too far back. In this case the resilient mounting is only compressed by a small amount, and again the pattern is embossed correctly. In FIG. 5c, the stick is inserted at the central position 24, but is at an angle to the correct orientation. As a result, the product surface 21 is tilted so that it is not parallel to the stamping surface 5. In this case the resilient mounting is compressed more on one side than the other as the stamping surface 5 makes contact with the product surface 21, thus allowing the stamping surface to tilt until it is parallel to the product surface. Yet again the pattern is embossed correctly.

The mounting may comprise more than one resilient means. However, for simplicity, the mounting preferably comprises a single resilient means. It has been found that a single resilient means allows the stamping surface to position and align itself with respect to the surface of the coated frozen confection. More preferably the single resilient means comprises a spring. A spring provides a simple and inexpensive mounting which allows the stamping surface to position and align itself with respect to the surface of the coated frozen confection. Most preferably the spring has a spring constant of from 0.1 to 0.5 N/mm. It has been found that springs having a spring constant in this range are particularly suitable. If the spring constant is larger than 0.5 N/mm the spring is too stiff (i.e. the spring constant is too large), the stamping surface cannot fully align with the surface of the coated frozen confection. On the other hand, if the spring is not stiff enough, the spring cannot support the weigh of the stamp, so that the stamp flops downwards and oscillates a great deal as the support is moved. Some oscillation of the stamp on the end of the spring is acceptable, because the oscillation stops immediately that the stamp makes contact with the surface of the frozen confection.

The various features of the embodiments of the present invention referred to in individual sections above apply, as appropriate, to other sections mutatis mutandis. Consequently features specified in one section may be combined with features specified in other sections as appropriate.

All publications mentioned in the above specification are herein incorporated by reference. Various modifications and variations of the described methods and apparatus of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A process for stamping a pattern onto a coated frozen confection comprising the steps of:
   a) at least partially covering the frozen confection with a layer of coating; and
   b) bringing a stamping surface comprising a base and one or more features which are raised out of and/or recessed into the base into contact with the coated frozen confection;
   wherein the stamping surface is resiliently mounted on a support and is allowed to tilt when it comes into contact with the surface of the coated frozen confection.

2. A process according to claim 1 further comprising before steps (a) and (b) the steps of:
   (i) extruding a frozen confection from a nozzle;
   (ii) inserting a stick into the frozen confection;
   (iii) cutting the frozen confection into pieces;
   wherein steps (ii) and (iii) take place simultaneously or in either order during step (i);
   and then subsequently
   (iv) handling the frozen confection by the stick.

3. A process according to claim 1 wherein in step (b) the coating is liquid.

4. A process according to claim 1 wherein the stamping surface is resiliently mounted on the support by a single resilient means.

5. A process according to claim 4 wherein the single resilient means comprises a spring.

6. A process according to claim 5 wherein the spring has a spring constant of from 0.1 to 0.5N/mm.

7. A process according to claim 1 wherein the coating is chocolate or a chocolate analogue.

8. A process according to claim 1 wherein the frozen confection is ice cream.

9. A process according to claim 1 wherein step (b) takes place from 1 to 10 seconds after step (a).

10. A process according to claim 1 wherein the stamping surface is at a temperature of below −5° C. in step (b).

11. A process according to claim 1 wherein the thickness of the coating layer is from 0.5 to 5 mm.

12. A process according to claim 1 wherein the stamping surface comprises features with a height of from 0.5 to 1.5 mm.

13. The process according to claim 1 wherein the height of any raised features are not so great that the raised features penetrate through the coating.

14. The process according to claim 1 wherein when the stamping surface is resiliently mounted on a support it positions and aligns itself with respect to the surface to be stamped as they come into contact.

* * * * *